US009041511B2

(12) United States Patent
Gaviria Velez et al.

(10) Patent No.: US 9,041,511 B2
(45) Date of Patent: May 26, 2015

(54) FACILITY MANAGEMENT USING MOBILE DEVICES

(75) Inventors: Rafael Andres Gaviria Velez, Medford, MA (US); Lee N. Goodman, Tyngsboro, MA (US); Elliot G. Eichen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 695 days.

(21) Appl. No.: 13/099,599

(22) Filed: May 3, 2011

(65) Prior Publication Data

US 2012/0280784 A1 Nov. 8, 2012

(51) Int. Cl.
*H04M 1/725* (2006.01)
*H04M 1/2745* (2006.01)

(52) U.S. Cl.
CPC .... *H04M 1/72522* (2013.01); *H04M 1/274508* (2013.01)

(58) Field of Classification Search
CPC ..... H04L 67/02; H04L 29/06; H04L 63/0428; H04L 63/08; H04L 63/102; H04L 63/107; H04L 63/12; H04L 67/12; H04L 67/18; H04L 67/30; H04L 67/306; H04L 69/329; H04M 3/42229; H04W 12/02; H04W 28/18; H04W 4/00; G06Q 30/02; G06Q 10/10; G06Q 10/06; G01F 1/60; G01F 2221/2149; Y10S 707/99931
USPC .......... 340/5.1, 5.2, 5.21, 5.6, 5.61, 5.64, 5.7, 340/5.8, 5.81, 539.1, 539.11; 455/41.1, 455/41.2; 710/303, 304; 709/203, 219, 223, 709/224, 227, 229
See application file for complete search history.

(56) References Cited

U.S. PATENT DOCUMENTS

| | | | | |
|---|---|---|---|---|
| 5,553,314 | A * | 9/1996 | Grube et al. | 455/514 |
| 6,359,711 | B1 * | 3/2002 | Cole et al. | 398/58 |
| 7,847,675 | B1 * | 12/2010 | Thyen et al. | 340/5.2 |
| 2002/0055987 | A1 * | 5/2002 | Tsujisawa | 709/219 |
| 2005/0107112 | A1 * | 5/2005 | Deeds | 455/550.1 |
| 2006/0178932 | A1 * | 8/2006 | Lang | 705/14 |
| 2009/0156222 | A1 * | 6/2009 | Bender | 455/445 |
| 2010/0052844 | A1 * | 3/2010 | Wesby | 340/5.7 |
| 2010/0095139 | A1 * | 4/2010 | Murphy et al. | 713/300 |
| 2011/0131484 | A1 * | 6/2011 | Paul et al. | 715/239 |
| 2011/0244798 | A1 * | 10/2011 | Daigle et al. | 455/41.2 |
| 2012/0046074 | A1 * | 2/2012 | Gittleman et al. | 455/557 |
| 2012/0169461 | A1 * | 7/2012 | Dubois, Jr. | 340/5.61 |
| 2012/0218075 | A1 * | 8/2012 | Hill | 340/5.61 |
| 2014/0146369 | A1 * | 5/2014 | Kamijoh et al. | 358/3.28 |

* cited by examiner

*Primary Examiner* — Brian Zimmerman
*Assistant Examiner* — Laura Nguyen

(57) ABSTRACT

A method includes docking a mobile device in a docking station and providing, by the mobile device, identification information to the docking station, where the identification information identifies a user associated with the mobile device. The method also includes forwarding, by the docking station, the identification information to a network device, and receiving, by the network device, the identification information. The method also includes updating, by the network device, a database based on the received identification information.

20 Claims, 8 Drawing Sheets

500

| | EMPLOYEE 502 | LOCATION 504 | SITE 506 | OTHER 508 |
|---|---|---|---|---|
| 520 | JOE SMITH | ROOM 201 | WALTHAM | 781-555-9876 |
| 530 | NANCY ROGERS | RM 300/A4 | ARLINGTON | 703-123-4567 |
| 540 | | OFFICE 424 | HIDDEN RIDGE | |
| | ... | ... | ... | ... |

FIG. 5

FACILITY MANAGEMENT USING MOBILE DEVICES

BACKGROUND INFORMATION

Employees of companies frequently travel to various company work sites or work from different offices within a single site. This makes it difficult to track the location of all employees at any given time. As a result, managing company facilities that include mobile employees is also very difficult.

BRIEF DESCRIPTION OF THE DRAWINGS

FIG. 5 is an exemplary table stored in the server of FIG. 1;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to identifying an employee's location based on a location of his/her mobile device. For example, a user may "dock" his/her mobile device in a docking station that communicates with a server. The server may receive presence information when the mobile device is docked and update an employee database indicating the location of the employee. In another implementation, the user's mobile device may be used to authenticate the user. For example, the user's credentials or personal information may be stored in the mobile device. In such an implementation, a secured location may include a device that interacts with the mobile device to determine whether the user will be granted access to the secured location.

Figure 1:
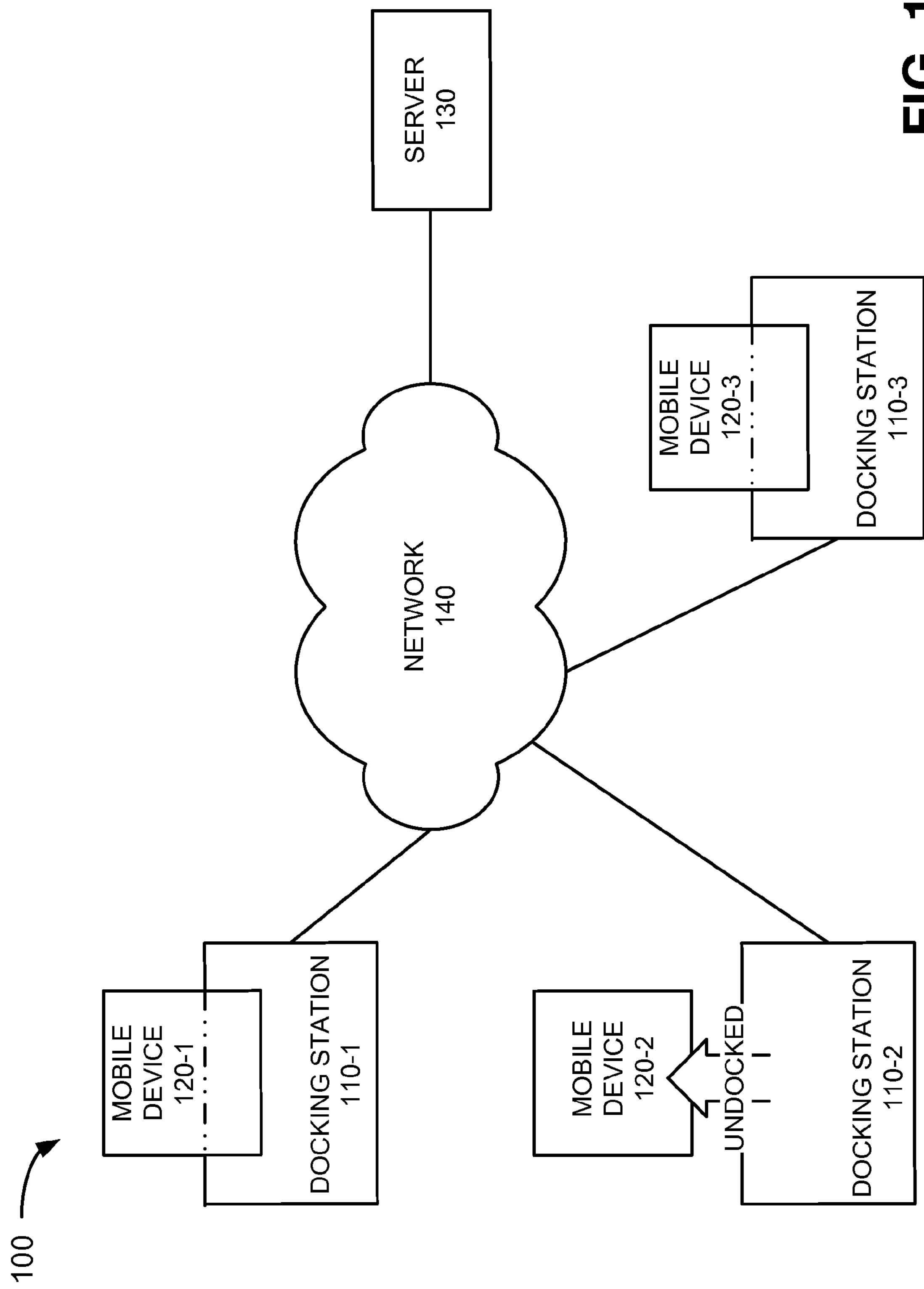
FIG. 1 illustrates an exemplary network in which systems and methods described herein may be implemented.

FIG. 1 is a block diagram of an exemplary network 100 in which systems and methods described herein may be implemented. Network 100 may include docking stations 110-1 through 110-3 (referred to individually as docking station 110 or collectively as docking stations 110), mobile devices 120-1 through 120-3 (referred to individually as mobile device 120 or collectively as mobile devices 120), server 130 and network 140.

Docking station 110 may include a Voice over Internet Protocol (VoIP) device that has a connection to a VoIP network and which also has a docking port which permits a mobile device (e.g., mobile device 120) to be "docked" with docking station 110. While docked in docking station 110, docking station 110 may interact with mobile device 120 and also communicate with network 140 via a wired or wireless connection. For example, docking station 110 may connect to other devices in network 100 via a local area network (LAN), wide area network (WAN) or metropolitan area network (MAN) included in network 140.

Mobile device 120 may include, for example, a cellular telephone (e.g., a smart phone), a tablet computer, a personal digital assistant (PDA), a netbook or other type of digital computing device that has the capability to communicate via one or more networks. As discussed above, mobile device 120 may be "docked" with docking station 110, as illustrated by mobile device 120-1 and 120-3 being physically connected to mobile device 110. Mobile device 120 may also be "undocked," as illustrated by mobile device 120-2, by physically removing mobile device 120-1 from docking station 110-2, as illustrated by the arrow labeled "undocked" in FIG. 1.

Server 130 may include one or more computing devices, servers and/or backend systems that are able to connect to network 140 and transmit and/or receive information via network 140. In one implementation, server 130 may include an application or system that receives location information associated with mobile devices 120 that are docked to docking stations 110. In response, server 130 may update a database that provides location information associated with a number of different parties that have mobile devices 120.

Network 140 may include one or more wired, wireless and/or optical networks that are capable of receiving and transmitting data, voice and/or video signals, including multimedia signals that include voice, data and video information. For example, network 140 may include one or more public switched telephone networks (PSTNs) or other type of switched network. Network 140 may also include one or more wireless networks and may include a number of transmission towers for receiving wireless signals and forwarding the wireless signals toward the intended destinations. Network 140 may further include one or more satellite networks, one or more optical networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of receiving and transmitting data.

The exemplary configuration illustrated in FIG. 1 is provided for simplicity. It should be understood that a typical network may include more or fewer devices than illustrated in FIG. 1. For example, three docking stations 110, three mobile devices 120, one server 130 and one network 140 are shown for simplicity. It should be understood that network 100 may include hundreds or thousands of docking stations 110, mobile devices 120, servers 130 and networks 140. Network 140 may also include additional elements, such as switches, gateways, routers, backend systems, etc., that aid in routing information, such as data to/from docking stations 110, mobile devices 120 and server 130. In addition, although docking station 110, mobile device 120 and server 130 are shown as separate devices in FIG. 1, in other implementations, the functions performed by two or more of these devices may be performed by a single device or platform. Also, in some instances, one or more of the devices of network 100 may perform one or more functions described as being performed by another one or more of the devices of network 100.

Figure 2:
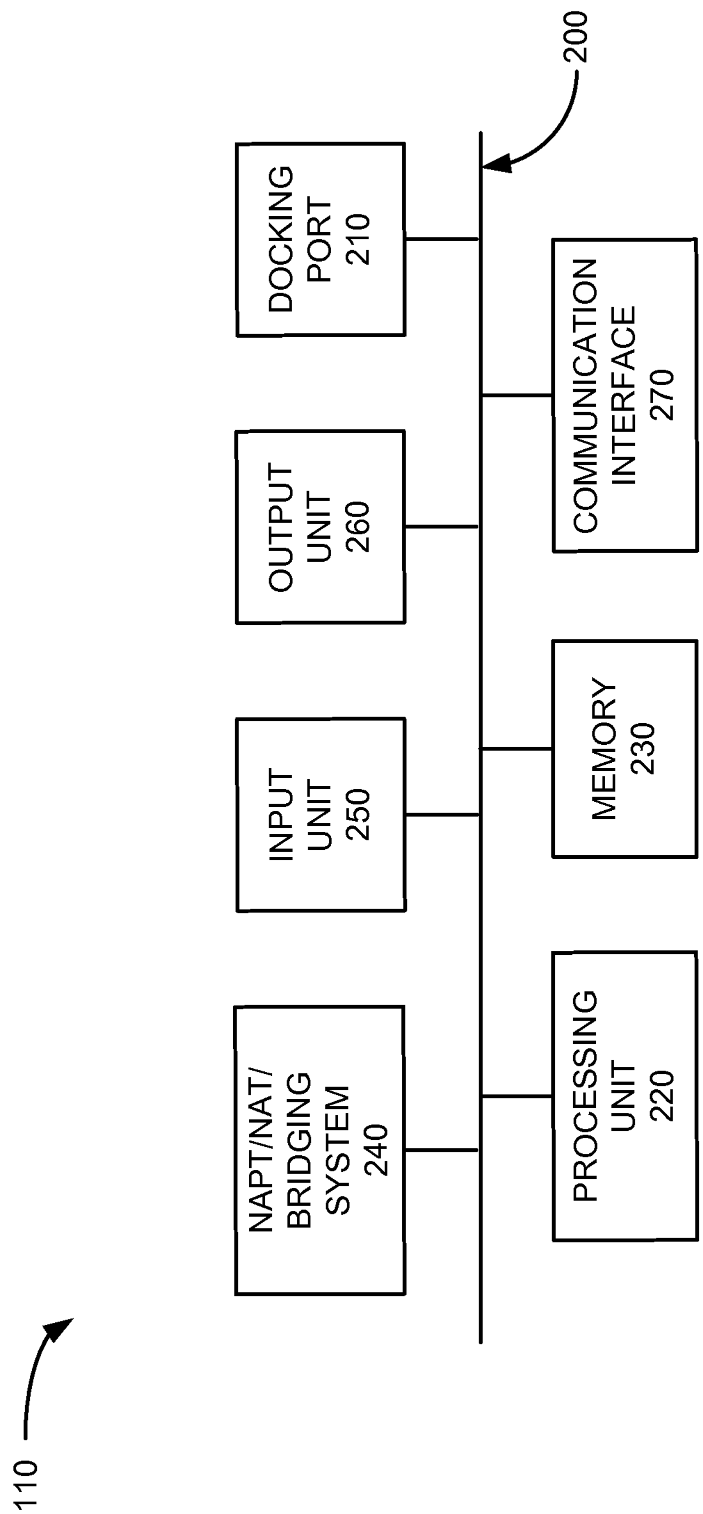
FIG. 2 illustrates an exemplary configuration of the docking station of FIG. 1.

FIG. 2 is a diagram illustrating exemplary components of docking station 110. Referring to FIG. 2, docking station 110 may include a bus 200, a docking port 210, a processing unit 220, a memory 230, a network address and port translation (NAPT)/network address translation (NAT)/Bridging system 240, an input unit 250, an output unit 260 and a communication interface 270

Bus 200 may include a path that permits communication among the elements of docking station 110. Docking port 210 may include a port that physically engages with a tray or slot in docking station 110 into which mobile device 120 is inserted. The shape and size of the tray or slot in docking station 110, as well as the shape and size of docking port 210 may vary based on different external configurations of various mobile devices 120. Docking port 210 may further include a universal serial bus (USB) port or interface (not shown), which also include a charging port. That is, docking port 210 may include a USB port/interface that simultaneously acts as a data port and a battery charging port. The charging port may include an electrical connection for supplying a charging current to a battery of mobile device 120. In other implementations, docking station 110 may include multiple USB ports (not shown) and/or a USB hub. In each case, the USB port(s) may include an electrical connection for the USB that may interconnect docking station 110 with mobile device 120.

While docked in docking station 110, mobile device 120 may control the operation of docking station 110. For example, if mobile device 120 includes a touch panel display, the touch panel display may be used for dialing a call, such as a VoIP call, that will be transmitted from docking station 110. Similarly, if mobile device 110 is a smart phone with a number of applications, such as a contact list, call list, etc., the user may use the call list to initiate a call to a particular contact in the call list. The call, however, may be placed via docking station 110, which as described above, may initiate a VoIP call via network 140.

Processing unit 220 may include a processor, microprocessor, or processing logic that may interpret and execute instructions. Memory 230 may include a random access memory (RAM) or another type of dynamic storage device that may store information and instructions for execution by processing unit 220. Memory 230 may also include a read only memory (ROM) device or another type of static storage device that may store static information and instructions for use by processing unit 220. Memory 230 may further include a solid state drive (SDD). Memory 230 may also include a magnetic and/or optical recording medium (e.g., a hard disk) and its corresponding drive.

Input device 240 may include a mechanism that permits a user to input information to docking station 110, such as a keyboard, a keypad, a mouse, a pen, a microphone, a touch screen, voice recognition and/or biometric mechanisms, etc. Input device 240 may also include mechanisms for receiving input via radio frequency communications or near field communications. Output device 250 may include a mechanism that outputs information to the user, including a display, a printer, a speaker, etc.

NAPT/NAT/bridging system 240 may include a system on a chip (SOC) that implements NAPT or NAT which modifies network address information in incoming packets for the purpose of translating one IP address space into another (e.g., remaps routable public IP addresses into private, non-routable IP addresses). NAPT/NAT/bridging system 240, when implementing NAPT or NAT, may be used as a firewall and to control traffic sent to mobile device 120 via docking station 110, thereby enhancing the security of, and control over, traffic carried by the docked mobile device 120. In other exemplary implementations, NAPT/NAT/bridging system 240 may include a SOC that implements a bridging mode which may forward packets, at layer 2, from network 140, though docking station 110, to mobile device 120. Additionally, the SOC implementing the bridging mode may forward packets, at layer 2, from mobile device 120, though docking station 110, to network 140.

Communication interface 270 may include a transceiver for communicating with network 140. For example, communication interface 270 may also include one or more interfaces for communicating with mobile devices 110 when mobile device 110 is docked to docking station 110. In some implementations, communication interface 270 may include a near field communication (NFC) interface that allows docking station 110 to communicate with mobile device 120 when mobile device 120 is located in close proximity to docking station 110, but not docked with docking station 110.

The configuration of components of docking station 110 illustrated in FIG. 2 is for illustrative purposes only. Other configurations may be implemented. Therefore, docking station 110 may include additional, fewer and/or different components than those depicted in FIG. 2. For example, docking station 110 may include a system(s) for implementing an Ethernet switch (not shown in FIG. 2), and/or for implementing Virtual Local Area Networks (VLANs). Docking station 110 may further include a magnetic sensor that may detect the insertion of mobile device 120 into docking port 210 and may thereby initiate various functions at docking station 110 or at mobile device 120 (e.g., initiate execution of a VoIP application or other application at mobile device 120, etc.).

Figure 3:
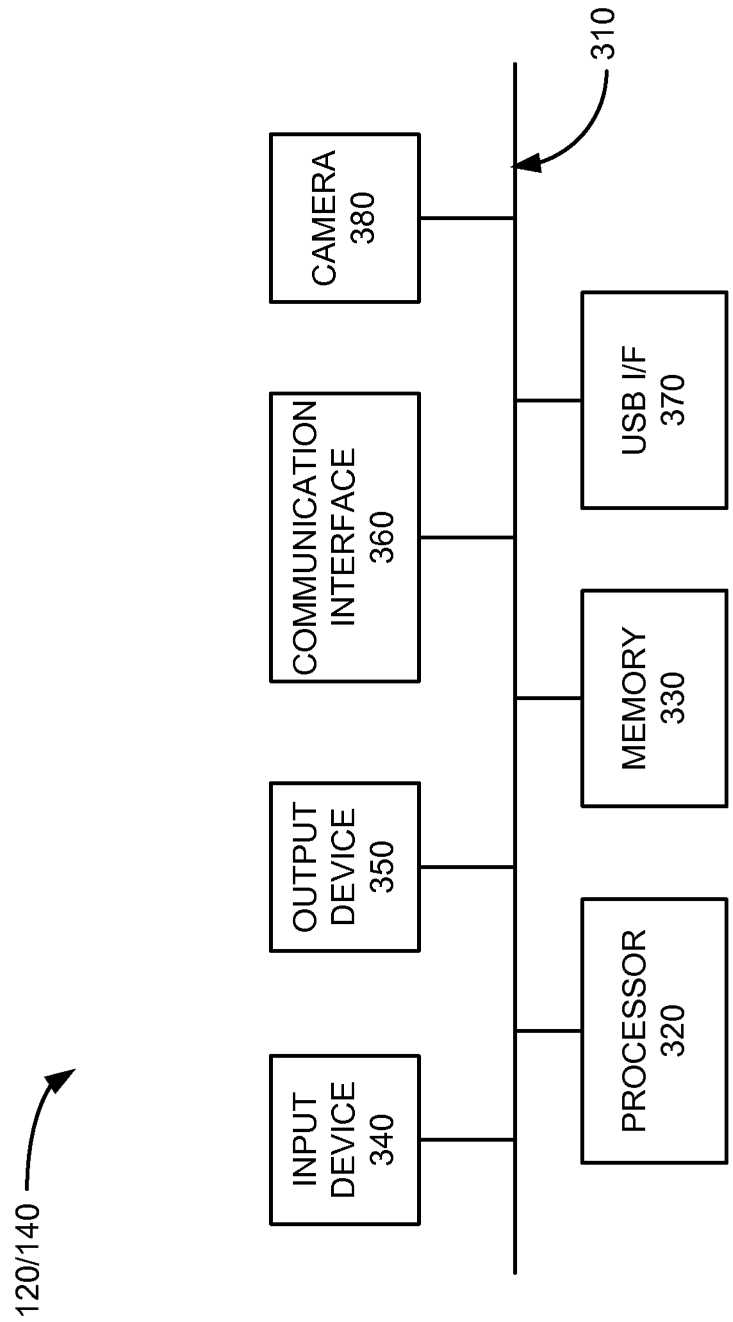
FIG. 3 illustrates an exemplary configuration of logic components implemented in one or more of the devices of FIG. 1.

FIG. 3 is a diagram illustrating exemplary components of mobile device 120. Mobile device 120 may include a bus 310, a processor 320, a memory 330, an input device 340, an output device 350, a communication interface 360, a USB interface 370 and a camera 380.

Bus 310 may include a path that permits communication among the elements of mobile device 120. Processor 320 may include a processor, microprocessor, or processing logic that may interpret and execute instructions. Memory 330 may include a random access memory (RAM) or another type of dynamic storage device that may store information and instructions for execution by processor 320. Memory 330 may also include a ROM device or another type of static storage device that may store static information and instructions for use by processor 330. Memory 330 may further include a magnetic and/or optical recording medium.

Input device 340 may include one or more mechanisms that permit an operator to input information to mobile device 120, such as a keypad or a keyboard, voice recognition and/or biometric mechanisms, etc. Output device 350 may include one or more mechanisms that output information to the operator, including a display, a speaker, etc. Communication interface 360 may include any transceiver mechanism that enables mobile device 120 to communicate with other devices and/or systems. For example, communication interface 360 may include a radio frequency transceiver for communicating via a public land mobile network (PLMN), a global system for mobile communications (GSM), a satellite network, etc., that may be included in network 140. In some implementations, communication interface 360 may include a near field communication (NFC) interface/system that allows mobile device 120 to communicate with docking station 110 (or other devices) when mobile device 120 is located in close proximity to docking station 110 (or other devices), but not docked with docking station 110. For example, an NFC system in mobile device 120 may include a short range, high frequency system that enables the short range exchange of data with another device (e.g., docking station 110) that includes a similar NFC system.

USB I/F 370 may include interconnection mechanisms to permit mobile device 120 to physically and electrically connect with a mating USB port (e.g., docking port 210) of docking station 110.

Camera 380 may include one or more cameras used to capture images or videos. Camera 380 may be used in connection with a security-related application stored in mobile device 120, as described in detail below.

The configuration of components of mobile device 120 illustrated in FIG. 3 is for illustrative purposes only. Other configurations may be implemented. Therefore, mobile device 120 may include additional, fewer and/or different components than those depicted in FIG. 3. For example, mobile device 120 may include a global positioning system (GPS) unit that may be used for determining a location of mobile device 120.

Server 130 may be configured in a similar manner as mobile device 120 illustrated in FIG. 3. For example, server 130 may include one or more processors 320, memories 330, input devices 340, output devices 350 and communications interfaces 360, as described above. However, in an exemplary implementation, server 130 may not include USB I/F 370 and camera 380.

Docking station 110, mobile device 120 and/or server 130 may perform operations in response to their respective processing units/processors (e.g., processing unit 220, processor 320) executing sequences of instructions contained in a computer-readable medium, such as memory 230 or memory 330. A computer-readable medium may be defined as a tangible memory device. The software instructions may be read into memory 230/330 from another computer-readable medium (e.g., a hard disk drive (HDD), SSD, etc.), or from another device via communication interface 270/360. Alternatively, hard-wired circuitry may be used in place of or in combination with software instructions to implement processes consistent with the implementations described herein. Thus, implementations described herein are not limited to any specific combination of hardware circuitry and software.

Figure 4:
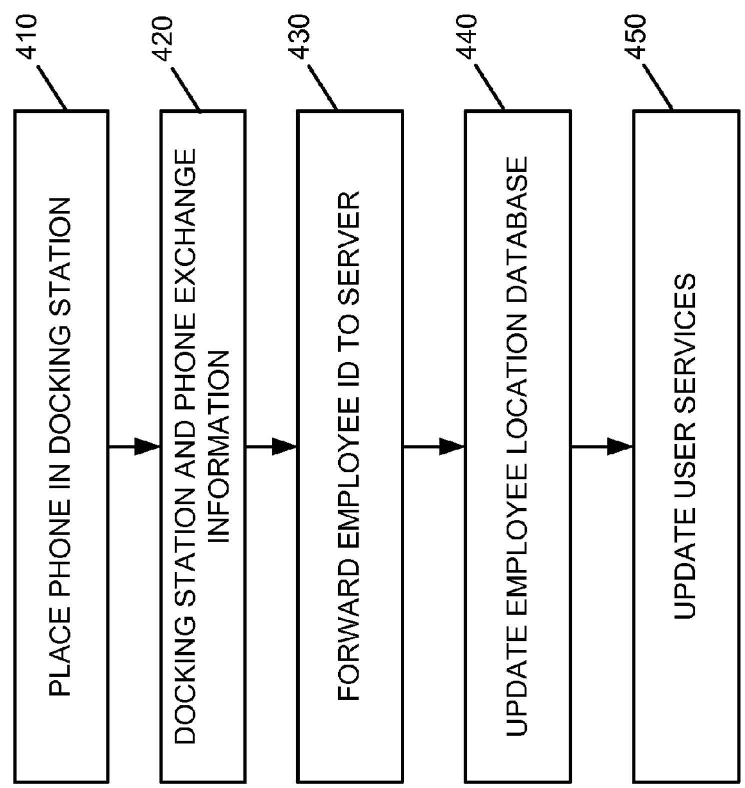
FIG. 4 is a flow diagram illustrating exemplary processing associated with devices included in the network of FIG. 1.

FIG. 4 is a flow diagram illustrating exemplary processing associated with components of network 100. Processing may begin with a user placing his/her mobile device 120 into a docking station 110 (block 410). For example, a user associated with mobile device 120-1 may come to work, identify an open office or cubicle, and place his/her mobile device 120-1 into a docking station 110-1 located in the cubicle or office.

Once mobile device 120-1 is docked, mobile device 120-1 and docking station 110-1 may exchange information (block 420). For example, docking station 110 may forward information to mobile device 120 identifying the work location, such as the location of docking station 110-1 (block 420). Mobile device 120-1 may execute a program associated with docking mobile device 120-1 and provide an identifier (ID), such as an employee ID associated with the user of mobile device 120, to docking station 110 (block 420).

Docking station 110 may forward information regarding the location of the particular employee associated with mobile device 120-1 to server 130 (block 430). For example, server 130 may forward an employee ID to server 130 via network 140. Server 130 may then update or populate an employee database associated with tracking employee locations based on the received information (block 440).

In one implementation, server 130, in connection with docking station 110, may populate the employee database based on information received via, for example, a hypertext transfer protocol secure (HTTPS) message received from docking station 110. The information may include information identifying the identity of the employee whose mobile device 120-1 is docked in docking station 110-1, information identify the room and/or cubicle number in which docking station 110-1 is located, information identifying the building and/or city in which docking station 110-1 is located. In other implementations, information identifying the party associated with mobile device 120-1 and the location of docking station 110-1 (e.g., room, cubicle, building, etc.) may be sent to server 130 via other mechanisms, such as HTTP, SIP, etc.

In each case, once server 130 receives the information regarding the user associated with mobile device 120-1 and the location of docking station 110-1, server 130 updates a database of employees/users and corresponding locations. For example, server 130 may update a real estate database used by corporate personnel to identify employees' locations. As an example, FIG. 5 illustrates an exemplary database 500 that may be stored in, for example, memory 330 of server 130. Referring to FIG. 5, database 500 may include employee field 502, location field 504, site field 506 and other field 508.

Employee field 502 may store information identifying a name or other identifier associated with an employee, such as an employee ID. Location field 504 may store information identifying a location, such as a room number, cubicle number, office number, etc., associated with the location of docking stations 110 and corresponding employees/users whose mobile devices 120 are docking in the respective docking stations 110. Site field 506 may store information identifying a company work site, such as a city or building number, associated with the location in field 504. Other field 508 may store additional information associated with a user, such as a telephone number of the mobile device 120 associated with the employee/user in field 502. Other field 508 may also store date and time information that may track the time when an employee in field 502 was located at the location identified in fields 504 and 506. This time/date information may create a transaction history for various purposes, such as auditing employee locations.

Server 130 may update database 500 upon receiving information via docking station 110. For example, assume that Joe Smith is carrying mobile device 120-1 and has docked mobile device 120-1 into docking station 110-1. Server 130 may receive information indicating that Joe Smith is in Room 201 in the Waltham facility. As a result, server 130 may populate entry 520 with this information. That is, field 502 in entry 520 stores the name Joe Smith (and/or an identifier associated with Joe Smith), field 504 stores the location Room 201 and field 506 stores the city/location of Waltham. In some implementations, the information in fields 504 and 506 may be pre-populated prior to mobile devices 120 actually docking with docking stations 110 since docking stations 110 may exchange information with server 130 at any time. For example, docking stations 110 may exchange information with server 130 upon powering up.

Server 130 may receive similar information when other mobile devices 120 are docking in docking stations 110. Similarly, when an employee removes his/her mobile device 120 from a docking station, that docking station signals server 130 that the mobile device 120 is no longer docked. Server 130 may then update database 500 to remove information from field 502 or indicate that the particular location is vacant. For example, entry 540 in database 500 includes no information in employee field 502, indicating that office 424 in Hidden Ridge is vacant. In this manner, database 500 may store current employee locations, as well as vacant locations that may be available for use.

In some implementations, server 130 and/or other external systems may update user services associated with the locations of employees (block 450). For example, in one implementation, various environmental or building services systems, such as a heating control system, an air conditioning control system, a lighting system, a building security system, etc., may access the information stored in table 500. Alternatively, server 130 may forward this information to various building service systems. In either case, the building service system may perform actions based on the occupancy or vacancy of a particular work location. As an example, a building heating or air conditioning system may provide heat or air conditioning to Room 201 in Waltham upon determining from database 500 that Room 201 is occupied by Joe Smith. Similarly, a lighting system may access database 500 and turn on lights in Room 201 upon determining that Room 201 is occupied by Joe Smith.

In other implementations, various corporate systems, such as a time-keeping system, an electronic company directory, etc., may access information or receive information stored in database 500. As one example, a time keeping system may track the times at which Joe Smith is at work based on information in database 500. As another example, a corporation's electronic directory accessible via a company intranet may update employee locations based on information stored in database 500. As still another example, a food services provider or cafeteria system may access information stored in database 500 to estimate the demand for food on a particular day, or use the data accumulated in database 500 over a period of time to estimate food requirements based on the past history.

In this manner, employees may be able to locate other employees, as well as locate vacant office space. For example, mobile device 120 may include an application that allow a user of the mobile device 120 to access database 500 and identify vacant offices/cubicles when he/she comes to work. That is, mobile device 120 may access database 500 and provide a query to identify vacant offices or cubicles. Server 130 may access database 500 and return a listing of offices/cubicles which are currently vacant. Such an application may be particularly useful in a "hotelling" arrangement where employees/workers work in different offices on a daily or weekly basis and are not assigned permanent work locations. By accessing database 500, an employee may easily find vacant office space.

As described above, mobile devices 120 may interact with docking stations 110 to facilitate locating employees within the company. Tracking employees locations via docking stations 110 is also useful when employees travel between different company work sites. In addition, tracking employee locations may be useful in emergency situations in which locating employees quickly is important.

Figure 6:
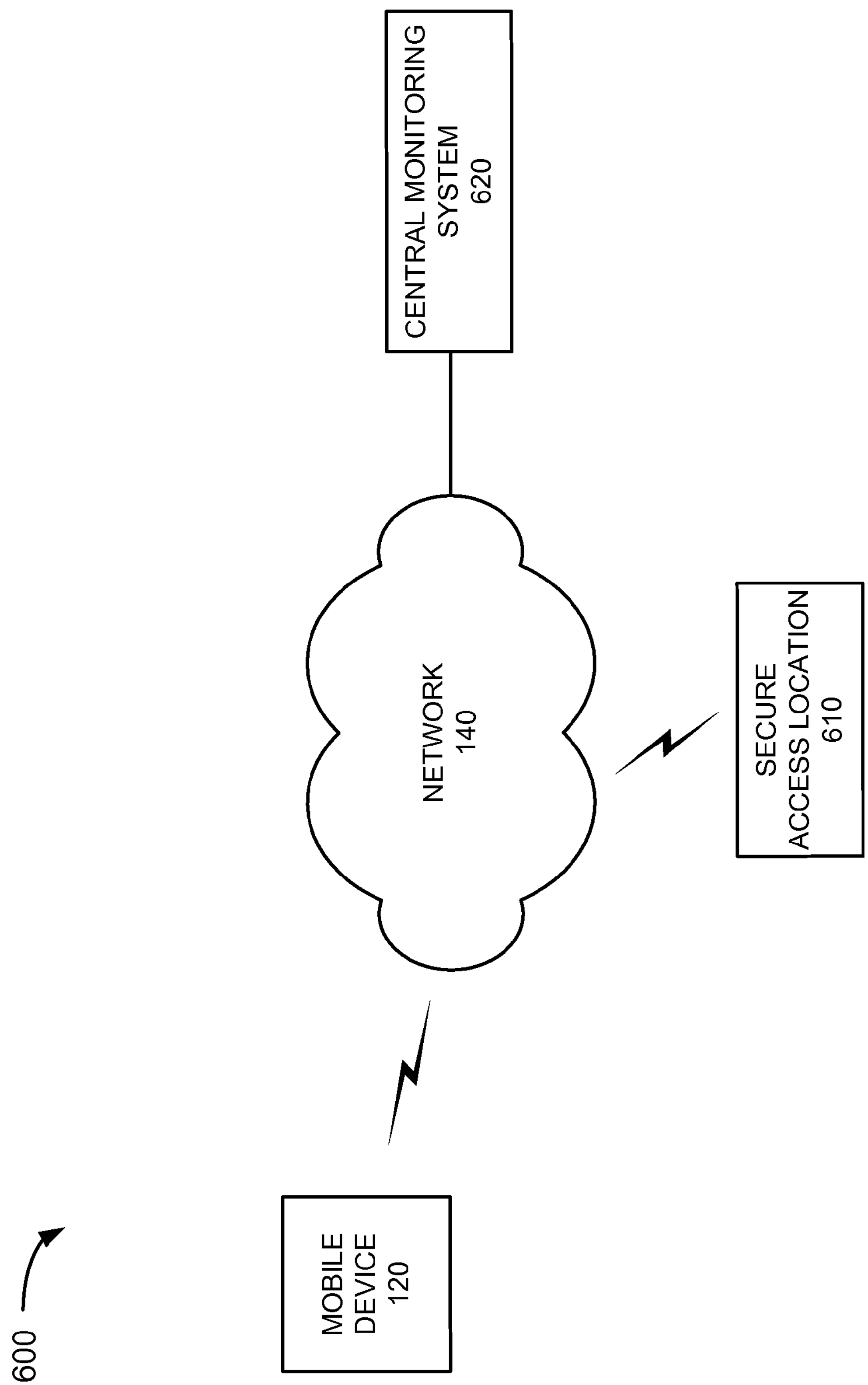
FIG. 6 illustrates another exemplary network in which systems and methods described herein may be implemented.

Mobile device 120 may also interface with other systems to aid in providing secure access to various sites. For example, FIG. 6 illustrates an exemplary system 600 that includes mobile device 120, network 140, secure access location 610 and central monitoring system 620. Secure access location 610 may represent a locked door or other secured location in which some type of user credentials or identification must be supplied to gain access. In an exemplary implementation, secure access location 610 may include a door or other entrance that includes an electronic lock. Secure access location 610 may also include a device that is able to read user credential information to determine whether to permit access (e.g., unlock the door). In some implementations, secure access location 610 may include a bar code or other code, such as a quick response (QR) code, that provides information for use by mobile device 120, as described in detail below.

Central monitoring system 620 may represent a centralized security system that monitors and/or provides security related functions for a particular environment, such as a building, offices or rooms within a building, a corporate campus, etc. In an exemplary implementation, mobile device 120 may include a software application that allows a user of mobile device 120 to gain access to secure access location 610 via mobile device 120, without requiring an access card that must be swiped or read at some access point, as described in detail below.

Figure 7:
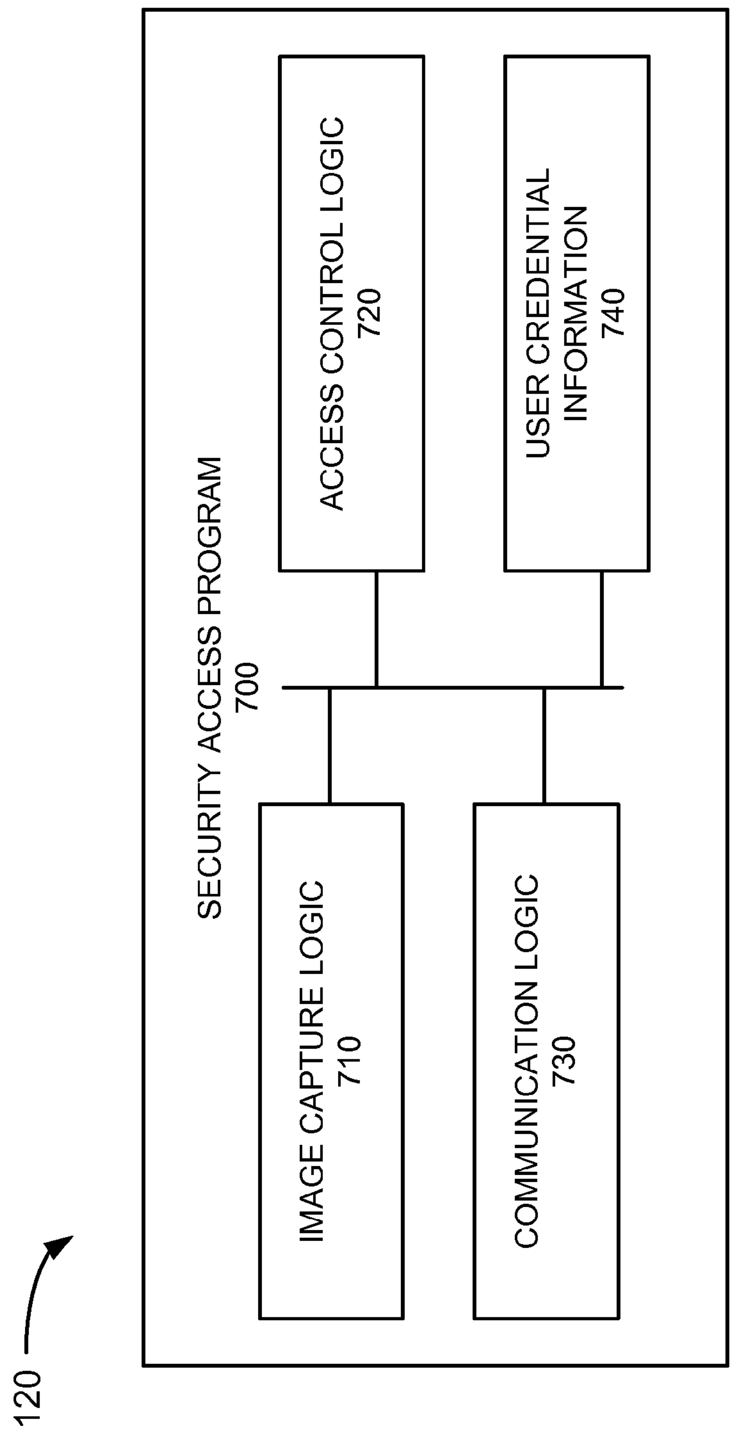
FIG. 7 illustrates exemplary logic components stored in the mobile device of FIG. 7.

For example, FIG. 7 is an exemplary functional block diagram of components implemented in mobile device 120. In an exemplary implementation, all or some of the components illustrated in FIG. 7 may be stored in memory 330. For example, memory 330 of mobile device 120 may include security access program 700. Referring to FIG. 7, security access program 700 may include a software program executed by processor 320 that allows mobile device 120 to perform security related functions. Security access program 700 may include image capture logic 710, access control logic 720, communication logic 730 and user credential information 740.

Image capture logic 710 may include a camera (e.g., camera 380, FIG. 3) or other device, such as a scanner, used to capture an image or video. For example, image capture logic 710 may take a picture of a bar code, such as a QR code, that is located at secure access location 610. The bar code or QR code includes encoded information that may be used to provide access control to a secured location, such as a building, an office or room within a building, etc., as described in detail below.

Access control logic 720 may include logic to allow mobile device 120 to interact with security access points, such as a secure access location 610, central monitoring system 620, etc. For example, access control logic 720 may exchange information with secure access location 610 and/or central monitoring system 620 to determine whether the user associated with mobile device 120 is allowed to gain access to a particular location. If access to the particular location is permitted, access control logic 720 may forward, via communication logic 730, a signal to the electronic lock to unlock the lock, as described in detail below.

Communication logic 730 may include logic to allow mobile device 120 to communicate with other devices or systems in network 700, such as secure access location 610, central monitoring system 620, etc. Communication logic 730 may communicate via a wireless protocol, such as Bluetooth, WiFi, or some other wireless protocol, or via one or more wired protocols. In some implementations, communication logic 730 may include a near field communication (NFC) interface that allows mobile device 120 to communicate with various devices, such as a reader at secure access location 610, when mobile device 120 is located in close proximity to the other device.

User credential information 740 may include information associated with the user of mobile device 120. For example, user credential information 740 may include information identifying the user of mobile device 120 (e.g., a name of the user, an employee ID, etc.), access locations to which the user of mobile device 120 will be granted access, and/or an access level associated with the user of mobile device 120. In other words, user credential information may include information that allows mobile device 120 to act as an electronic version of a swipe badge or user access card.

Figure 8:
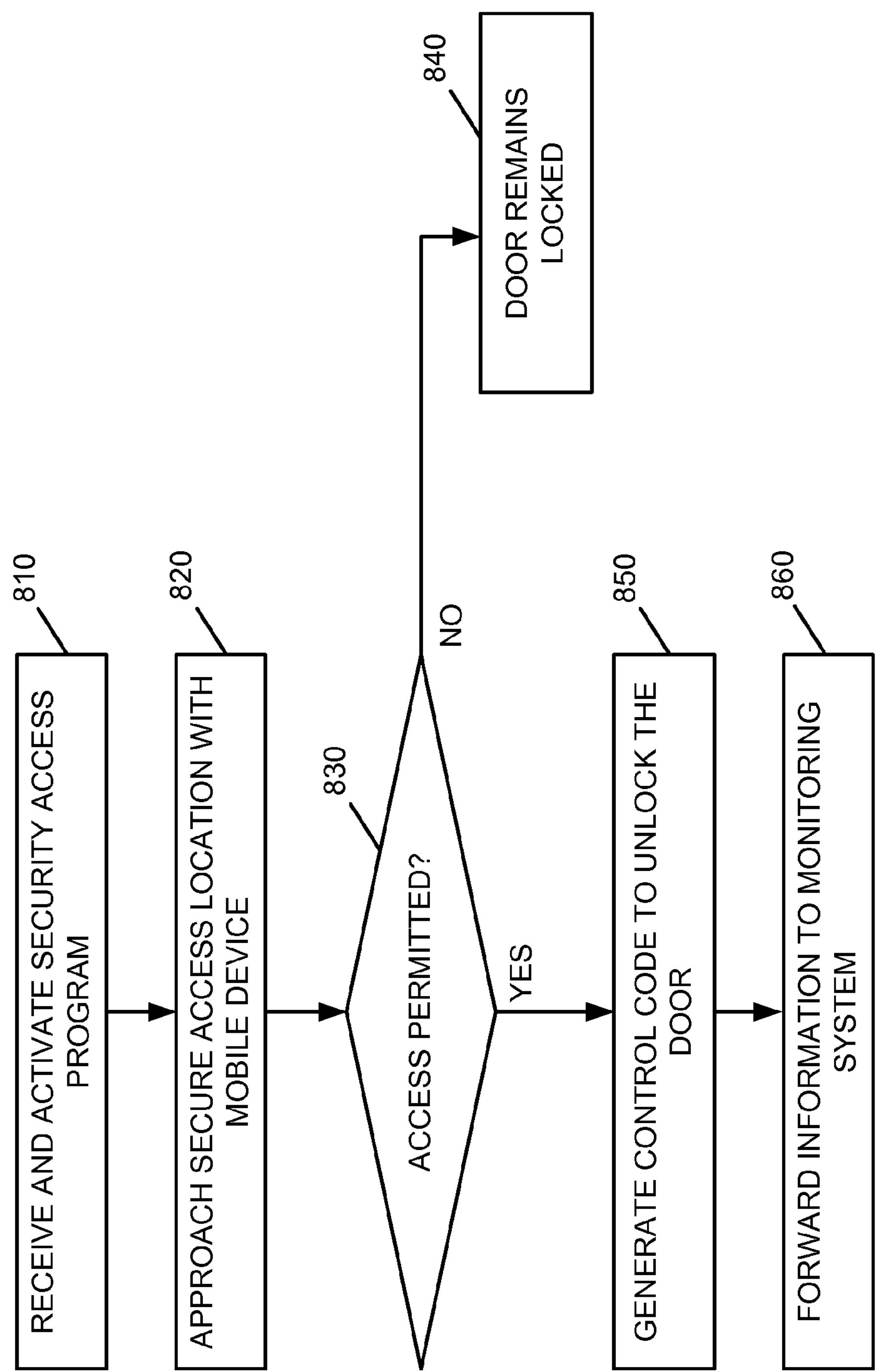
FIG. 8 is a flow diagram illustrating exemplary processing associated with devices included in the network of FIG. 6.

FIG. 8 is a flow diagram illustrating exemplary processing associated with providing secure access via mobile device 120. Processing may begin with mobile device 120 receiving or downloading security access program 700 and storing program 700 in memory 330 (block 810). For example, a user of mobile device 120 may request security access program 700 from central monitoring system 620 and mobile device 120 may receive program 700 via network 140. To receive and/or activate security access program 700, the user may have to enter various information via mobile device 120 (e.g., via a keypad or keyboard), such as the user's employee ID information or other personal credentials. Mobile device 120 may forward the user-entered information to central monitoring system 620, which in turn, may download the security access program 700 to mobile device 120 via network 140. Security access program 700 provided to mobile device 120 may include information particular to the user of mobile device 120.

For example, security access program 700 may receive information that permits mobile device 120 to gain access to a number of different locations, but may prevent access to other locations. As an example, a user associated with mobile device 120-1 may be permitted to access to all locations in the Waltham facility, but may not be permitted access to locations in another facility. In this case, access control logic 720 and/or user credential information 740 may store information indicating the appropriate level of access.

Assume that the user of mobile device 120 is at his/her work location and would like to access his/her office building which is locked. For example, assume that the user of mobile device 120 (carrying mobile device 120) approaches secure access location 610, which includes an electronically locked door (block 820). In one implementation, communication logic 730 at mobile device 120 may transmit the user credential information 740 to an access/reader device at secure access location 610. Alternatively, the reader at secure access location 610 may be able to remotely read the user credential information 740 stored in mobile device 120 when mobile device 120 is in close proximity to the reader, such as via NFC communications. In either case, secure access location 610 may determine whether access is permitted (block 830).

If the reader at secure access location 610 determines that access is not permitted (act 830—no), mobile device 120 will be unable to access the secured location and the electronic lock will remain locked (block 840). If, however, the reader at secure access location 610 determines that access is permitted (act 830—yes), secure access location 610 may generate a control code to unlock the door (block 850).

Access control point 610 and/or mobile device 120 may forward information associated with the transaction to central monitoring system 620 for record keeping purposes (block 860). For example, central monitoring system 620 may receive information indicating that mobile device 120-1 was used to enter Room 201 at 8:00 AM on Mar. 10, 2011. Central monitoring system 620 may store this information in a database for later use.

In the implementation described above, user credential information 740 stored on mobile device 120 is used to determine whether the user associated with mobile device 120 is permitted to access a secure location. In other implementations, mobile device 120 uses image capture device 710 to capture a bar code (e.g., a QR) code or other image, at secure access location 610. For example, image capture logic 710 may include camera 380 (FIG. 3). In this case, the user of mobile device 120 may take a picture of the bar code using camera 380. In other instances, image capturing logic 710 may include a scanner that the user of mobile device 120 will use to scan the image. In each case, access control logic 720 may determine whether access is permitted using the scanned image or picture.

For example, access control logic 720 may decode information in the captured bar code. After decoding the image, access control logic 720 may determine whether access to that location is permitted for the user of mobile device 120. For example, access control logic 720 included in security access program 700 provided by central monitoring system 620 may include a listing of locations or facilities in which the user of mobile device 120 is permitted to access. If access control logic 720 determines that access is not permitted, mobile device 120 will be unable to access the secured location and the electronic lock will remain locked. In other implementations, if access is not permitted, access control logic 720 may not be able to decode the information in the bar code or QR code captured by image capture logic 710.

If, however, access control logic 720 determines that the user is permitted to access the room associated with the decoded image at secure access location 610, access control logic 720 may generate a control code or signal to unlock the door. For example, access control logic 720 may generate an encoded signal that will be identified by the locking mechanism at access control location 610 as an "unlock" code. Communication logic 730 may transmit the encoded signal to secure access location 610. For example, communication logic 730 may transmit the encoded signal via a wireless protocol to secure access location 610.

Secure access location 610 may receive the signal and decode the signal. In this example, secure access location 610 may include logic that identifies the signal as an "unlock" command and unlocks the door. If, however, secure access location 610 was unable to decode the signal or the signal does not correspond to an "unlock" command, access control location 610 will not unlock the door.

In still other implementations, access control location 610 may include an electronic eye located adjacent the locked door. In this implementation, the user of mobile device 120 may place camera 380 of mobile device 120 up to the electronic eye that uses a laser to essentially "paint" an image on a charge-coupled device (CCD) chip of camera 380. Access control logic 720 may decode the image and determine whether access is permitted to access control location 720.

As described above, in some implementations, mobile device 120 and secure access location 610 may exchange information regarding a user's credentials to determine whether to allow access to the secured location. In such implementations, access control point 610 and/or mobile device 120 may include the logic or intelligence to lock/unlock a door associated with access control point 610, thereby eliminating the need to hardwire the locking mechanism at access control point 610 back to central monitoring system 620.

In other implementations, mobile device 120 and/or access control location 610 may send information to central monitoring system 620 to determine whether access will be permitted. For example, mobile device 120 may wirelessly transmit user credential information 740 to central monitoring system 620, which will determine whether access is permitted. If access is permitted, central monitoring system 620 may signal secure access location 610 to unlock the door.

In still other implementations, both mobile device 120 and secure access location 610 may communicate with central monitoring system 620, which will determine whether access is permitted. In such implementations, a dual credential exchange may occur for both mobile device 120 and secure access location 610. For example, the credentials associated with the user of mobile device 120 may be transmitted via a wireless protocol to central monitoring system 620, and secure access location 610 may transmit information to central monitoring system 620 using a wired connection via network 140. Central monitoring system 620 may then determine whether access is permitted based on the information received from mobile device 120 and secure access location 610.

Implementations described herein allow for automatic updating of a user/employee database based on locations of mobile devices docked in docking stations. A user may then access the database to identify locations of various parties. In addition, implementations described herein allow for a user's mobile device to be used to authenticate the user and provide access to a secured location. This may eliminate the need for security guards and/or a user having to physically carry security credentials, such as an access card or badge.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, a user may interact with a docking station to exchange information with the docking station. The docking station then forwards the information to a server that updates the database (e.g., database 500). In some implementations, docking station 110 may include a copy of the database and automatically update the database at docking station 110. Each other docking station 110 may have access to the updated database and perform updating in a similar manner.

In addition, features have been described above with respect to mobile device 120 including a security related program that interacts with some type of intelligent reader or logic at the secured access location to provide for access to secured locations. In other implementations, mobile device 120 may interact directly with an electronic locking mechanism, without the need for any processing logic/reader at the electronically locked door.

Further, while series of acts have been described with respect to FIGS. 4 and 8, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A mobile device, comprising:

a memory configured to store credential information associated with a user of the mobile device;

processing logic configured to:

determine whether the user is permitted to access a secured location, and generate a code or signal to unlock an electronic locking mechanism associated with the secured location, in response to determining that access is permitted;

a communication interface configured to transmit the code or signal to the electronic locking mechanism or to a device associated with the secured location to unlock the electronic locking mechanism; and a camera configured to capture an image from a laser located at the secured location, wherein the processing logic is further configured to:

decode the captured image, wherein when determining whether the user is permitted to access the secured location, the processing logic is configured to determine whether access is permitted based on the captured image, and wherein when generating a code or signal, the processing logic is configured to generate the code or signal to unlock the electronic locking mechanism, based on the captured image and in response to determining that access is permitted.

2. The mobile device of claim 1, wherein when transmitting, the communication interface is configured to:

transmit the code or signal using near field communications or a wireless protocol.

3. The mobile device of claim 1, wherein the processing logic is further configured to:

transmit information associated with obtaining access to the secured location to a central monitoring system.

4. The mobile device of claim 1, further comprising:

a docking port configured to electrically connect with a docking station, and wherein the processing logic is further configured to:

provide identification information associated with the user of the mobile device in response to electrically connecting with the docking station via the docking port.

5. The mobile device of claim 1, wherein the mobile device comprises a cellular telephone, a tablet computer, or a personal digital assistant (PDA).

6. The mobile device of claim 1, wherein the camera includes a charged coupled device (CCD) chip and the captured image is provided on the CCD chip.

7. A method, comprising:

storing, in a mobile device, credential information associated with a user of a mobile device;

determining, by the mobile device, whether the user is permitted to access a secured location;

generating, by the mobile device, a code or signal to unlock an electronic locking mechanism associated with the secured location, in response to determining that access is permitted;

transmitting, by the mobile device, the code or signal to the electronic locking mechanism or to a device associated with the secured location to unlock the electronic locking mechanism;

capturing, via a camera included in the mobile device, an image from a laser located at the secured location; and decoding, by the mobile device, the captured image, wherein the determining whether the user is permitted to access the secured location comprises determining, by the mobile device, whether access is permitted based on the captured image, and wherein the generating a code or signal comprises generating, by the mobile device, the code or signal to unlock the electronic locking mechanism, based on the captured image and in response to determining that access is permitted.

8. The method of claim 7, further comprising:

docking the mobile device in a docking station;

providing, by the mobile device, identification information to the docking station, the identification information identifying the user of the mobile device;

automatically forwarding, by the docking station, the identification information to a network device;

receiving, by the network device, the identification information;

automatically updating, by the network device, a database based on the received identification information;

providing, to the user of the mobile device and via the mobile device, access to the database, wherein the database identifies work locations that are currently vacant, work locations that are currently occupied, and employee identification information associated with the work locations that are currently occupied;

receiving, by the network device, a query from the mobile device to identify the work locations that are currently vacant; and providing, to the mobile device and in response to the query, information identifying the work locations that are currently vacant.

9. The method of claim 8, wherein the database includes information identifying a plurality of employees and corresponding work locations associated with each of the plurality of employees, wherein the work locations are based on locations associated with each of a plurality of docking stations in which a plurality of mobile devices associated with the plurality of employees are docked.

10. The method of claim 8, wherein the automatically forwarding further comprises:

forwarding information identifying the docking station or a location associated with the docking station to the network device.

11. The method of claim 8, further comprising:

providing, to a plurality of employees and via mobile devices associated with the plurality of employees, access to the database.

12. The method of claim 8, further comprising:

accessing the database by a time-keeping system and at least one of a heating system, an air conditioning system, a lighting system or a security system;

tracking, by the time-keeping system, times when the user of the mobile device was at work based on information stored in the database; and controlling at least one of the heating system, air conditioning system, lighting system or security system based on information stored in the database.

13. The method of claim 8, further comprising:

undocking the mobile device from the docking station; and updating the database to indicate that the user of the mobile device is no longer located at a location associated with the docking station.

14. The method of claim 8, further comprising:

accessing at least one of a call list or contact list stored in the mobile device; and placing a telephone call to a party stored in the call list or contact list via the docking station.

15. The method of claim 8, wherein the providing information identifying the work locations that are currently vacant comprises providing a listing of a plurality of work locations that are currently vacant.

16. The method of claim 7, wherein the transmitting comprises transmitting, by the mobile device, the code or signal using near field communications or a wireless protocol.

17. The method of claim 7, further comprising:

transmitting, by the mobile device, information associated with obtaining access to the secured location to a central monitoring system.

18. The method of claim 7, further comprising:

providing, by the mobile device, identification information associated with the user of the mobile device in response to electrically connecting a docking port of the mobile device with a docking station.

19. The method of claim 7, wherein the mobile device comprises a cellular telephone, a tablet computer, or a personal digital assistant (PDA).

20. The method of claim 7, wherein the camera includes a charged coupled device (CCD) chip and the captured image is provided on the CCD chip.

* * * * *